(12) United States Patent
Shah et al.

(10) Patent No.: US 6,226,689 B1
(45) Date of Patent: *May 1, 2001

(54) METHOD AND MECHANISM FOR INTERPROCESS COMMUNICATION USING CLIENT AND SERVER LISTENING THREADS

(75) Inventors: Bharat Shah, New Castle; Mario C. Goertzel, Kirkland; Mazhar N. Mohammed, Bellevue, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/790,104

(22) Filed: Jan. 29, 1997

(51) Int. Cl.[7] .................................................. G06F 13/00
(52) U.S. Cl. ............................................. 709/314; 709/330
(58) Field of Search ................................. 709/304, 227, 709/313, 314, 330; 714/14

(56) References Cited

U.S. PATENT DOCUMENTS 5,463,625 * 10/1995 Yasrebi ................................. 370/401
5,754,752 * 5/1998 Sheh et al. ............................. 714/4
6,131,126 * 10/2000 Kougiouris et al. ................. 709/330

OTHER PUBLICATIONS

John Shirley et al.; Microsoft RPC Programming Guide; O'Reilly & Associates, Inc.; pp. 1–20, 56–58, 96–116, May 1995.*

* cited by examiner

Primary Examiner—Kenneth R. Coulter
(74) Attorney, Agent, or Firm—Michalik & Wylie, PLLC

(57) ABSTRACT

A method and mechanism for interprocess communication between a thread of a client application and a thread of a server application. The mechanism includes a server listening thread and a client listening thread. The client thread sends a request to a server listening thread, and the server listening thread places the request in a message queue associated with the server thread. The request is received at the server thread and dispatched to a remote procedure for processing. Reply data received back from the remote procedure is sent to the client listening thread. The client listening thread notifies the client thread when the reply is received and gives the reply to the client thread.

18 Claims, 11 Drawing Sheets

| CLIENT APP. THREAD | WMSG THREAD (CLIENT) | SERVER APP. THREAD | WMSG THREAD (SERVER) |
|---|---|---|---|
| 1. Client makes a call to the RPC runtime asking for a buffer to be sent to the server. | WMSG thread is waiting for requests/replies. | Server Application thread is waiting in a message loop. | WMSG thread is waiting for requests/replies. |
| 2. Client thread uses datagram LPC to send the request to the server. | | | |
| 3. Client waits for reply from the server by calling the blocking hook provided by the client process. | | | 4. WMSG thread picks up the client's request |
| | | | 5. WMSG thread posts a message to the server's window. (The server thread will then dispatch this message). |
| | | 7. Server application thread, picks up the posted message and dispatches it. | 6. WMSG thread goes back to listening for more requests. |

TIME

FIG. 3A

| | | | |
|---|---|---|---|
| | | 8. RPC runtime actually dispatches the RPC request. | |
| | | 9. Server thread replies by doing an LPC send. | |
| | | Server thread goes back to its message loop. | |
| | 10. WMSG thread on the client, picks up the reply. | | |
| | 11. WMSG thread wakes up the client thread and gives it the reply buffer. | | |
| | 12. WMSG thread goes back to listening for more requests/replies. | | |
| 13. Client thread wakes up, picks up reply and returns to client application. | | | |

TIME

FIG. 3B

METHOD AND MECHANISM FOR INTERPROCESS COMMUNICATION USING CLIENT AND SERVER LISTENING THREADS

FIELD OF THE INVENTION

The invention relates generally to computer systems, and more particularly a method and mechanism for communication between computer applications.

BACKGROUND OF THE INVENTION

To accomplish multitasking, processes in computer systems running on contemporary operating systems such as Microsoft Corporation's Windows® NT™ or Windows® 95 contain one or more threads of execution. The processor switches control among the threads, which are coded like functions. In one threading architecture known as the apartment model, processes are divided into apartments, with one thread possessing a set of objects per apartment. To invoke an object's methods, an object is called through an interface proxy. The interface proxy switches to the thread of the object's apartment.

An interprocess communication mechanism allows a thread of one process to communicate with and pass data to a thread of another process. Basically, the mechanism allows a client process to send a request to a remote server process. However, if a client thread retains control and blocks pending a reply from the server, the client application will freeze until the reply is received. Since freezing an application is not desirable, a blocking function is provided so that the client can do other work such as reading messages from its message queue and dispatching them. A worker thread in OLE makes the call to the server via a synchronous, blocking local remote procedure call (LRPC), and blocks waiting for the reply. In this manner, while the call is in progress, the client application thread is free to perform other non-conflicting work, such as processing and dispatching messages.

On the server side, an RPC dispatch thread dispatches the call to OLE, which then blocks the dispatch thread, picks up the call and posts a message to the object's thread. The message asks the server application to pick up the request. Some time later, the server application executes the remote call, and returns reply data to the dispatch thread. The dispatch thread then unblocks and returns the call to the server RPC runtime to send the reply back to the client.

While the use of worker and dispatch threads thus provides desirable features, i.e., recursive calls between client and server object threads are allowed and applications are not blocked awaiting replies and receipt of requests and replies, such a mechanism is not very efficient. In particular, each call requires at least two thread-switching operations (i.e., two thread switches, one from the client thread to the worker thread and one back to the client thread) on the client and two thread switches on the server. Each thread switch involves saving one thread's context and loading another thread's context. Moreover, one worker thread is dedicated for each outstanding call made by the client, and a dispatch thread is dedicated for each dispatched call on the server. Multiple calls thus require multiple dedicated threads. Such an approach is thus expensive in terms of the number of threads used, and it is relatively slow.

OBJECTS AND SUMMARY OF THE INVENTION

Accordingly, it is a general objective of the present invention to provide a more efficient interprocess communication method and mechanism.

Another objective is to provide a method and mechanism of the above kind that uses less resources to accomplish interprocess communication.

A related objective is to provide a method and mechanism as characterized above that performs less thread switching operations.

In accomplishing those objects, it is a related objective to provide an interprocess communication method and mechanism that does not dedicate threads based upon the number of calls sent and/or received.

Briefly, the present invention provides a method and mechanism for interprocess communication including a server thread, a server listening thread associated with the server thread, a client thread and a client listening thread associated with the client thread. The client thread sends a request to the server listening thread, and the server listening thread places a message in a message queue associated with the server thread, preferably by calling the Windows post message API. The message includes the request sent to the server listening thread. The message is received at the server thread, preferably via a Windows message loop. The client request is processed and a reply is sent to the client listening thread. The client listening thread notifies the client thread when the reply is received and gives the reply to the client thread.

The processing of the client request by the server thread preferably includes dispatching the message from the server thread to a function in the remote procedure call runtime, and dispatching the request information from the runtime to a remote procedure. On return from the dispatch, the runtime sends the reply to the client.

Other objects and advantages will become apparent from the following detailed description when taken in conjunction with the drawings, in which:

BRIEF DESCRIPTION OF THE DRAWINGS

FIGS. 3A–3B comprise a timing diagram representing the flow of control among the threads when a client request is made to a server and a reply returned by the server;

DETAILED DESCRIPTION OF THE PREFERRED EMBODIMENT

Figure 1:
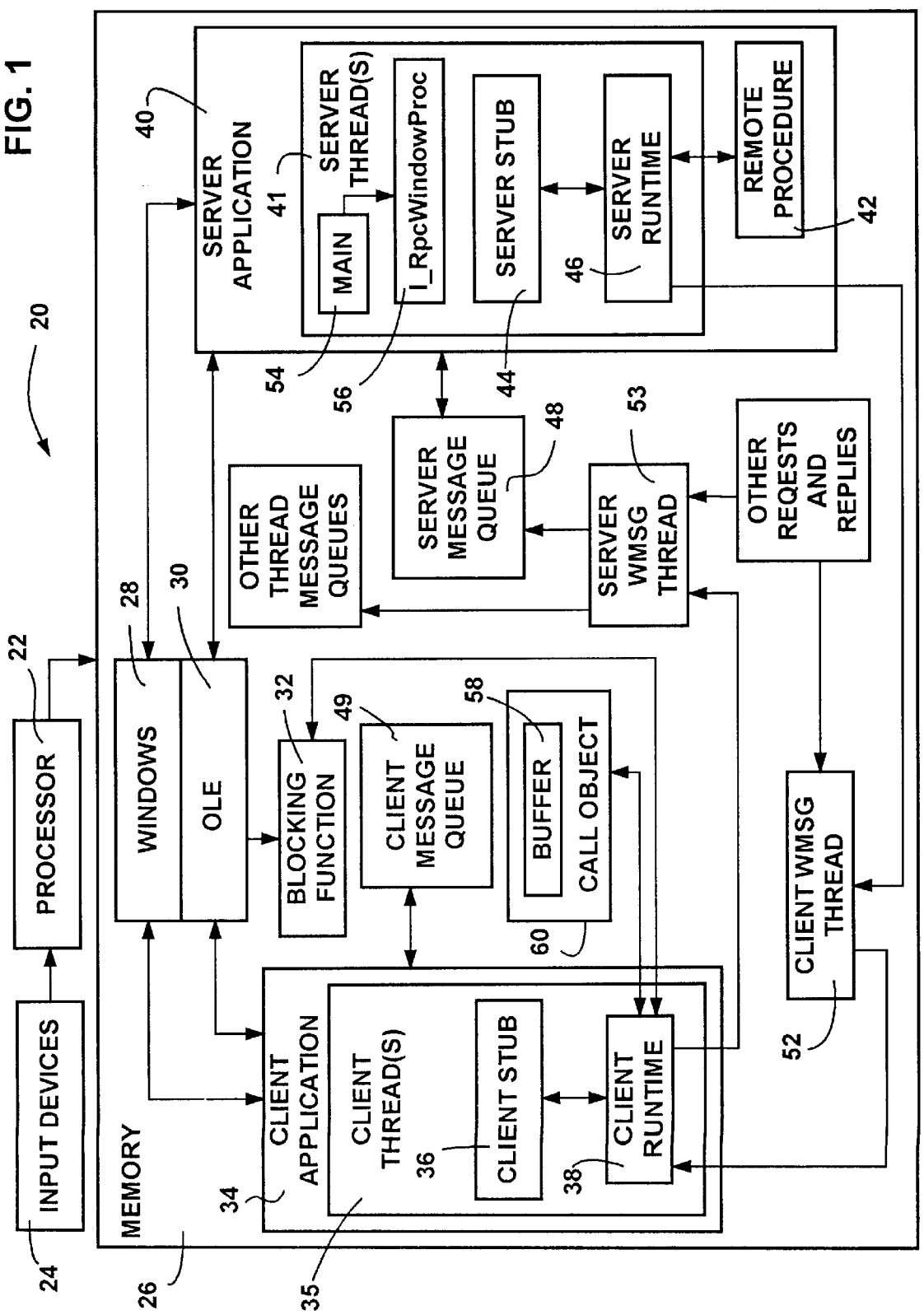
FIG. 1 is a block diagram representing a computer system into which the present invention may be incorporated.

Turning to the drawings and referring first to FIG. 1, there is shown a computer system generally designated 20 into which the present invention may be incorporated. The computer includes at least one processor 22 operatively connected to one or more input devices 24 such as a keyboard and/or a mouse, and to a memory 26. The memory 26 includes random access memory and/or non-volatile storage, which, as understood, can together comprise a large amount of virtual memory via swapping techniques. The memory 26 may contain instantiated objects and persistent data for other objects as understood in object-oriented technology, as well as other functions described below. The computer system 22 may be connected to other computers in a networked fashion.

The memory 26 has loaded therein a multitasking, Windows®-based operating system 28 or the like such as Windows® NT™ or Windows® 95. As is known, applications make API (application programming interface) calls to Windows® functions, and may be linked, either statically or dynamically, to OLE (also referred to as COM) functions and objects 30.

The memory 26 has stored therein a client application 34 including at least one thread of execution 35. So that the client application 34 can make remote procedure calls (RPC) to remote servers, the client application 34 has associated therewith a client stub 36 and an RPC runtime 38.

The memory 26 also has stored therein at least one server application 40, which includes at least thread of execution 41. The server 40 further includes at least one remote procedure 42 which it makes available to client applications. To this end, the server application 40 is associated with a server stub 44 and a server runtime 46. The server application 40 is a Windows® 28 application and includes a message queue 48 capable of having various messages therein which are processed and dispatched by the server application 40.

Figure 2:
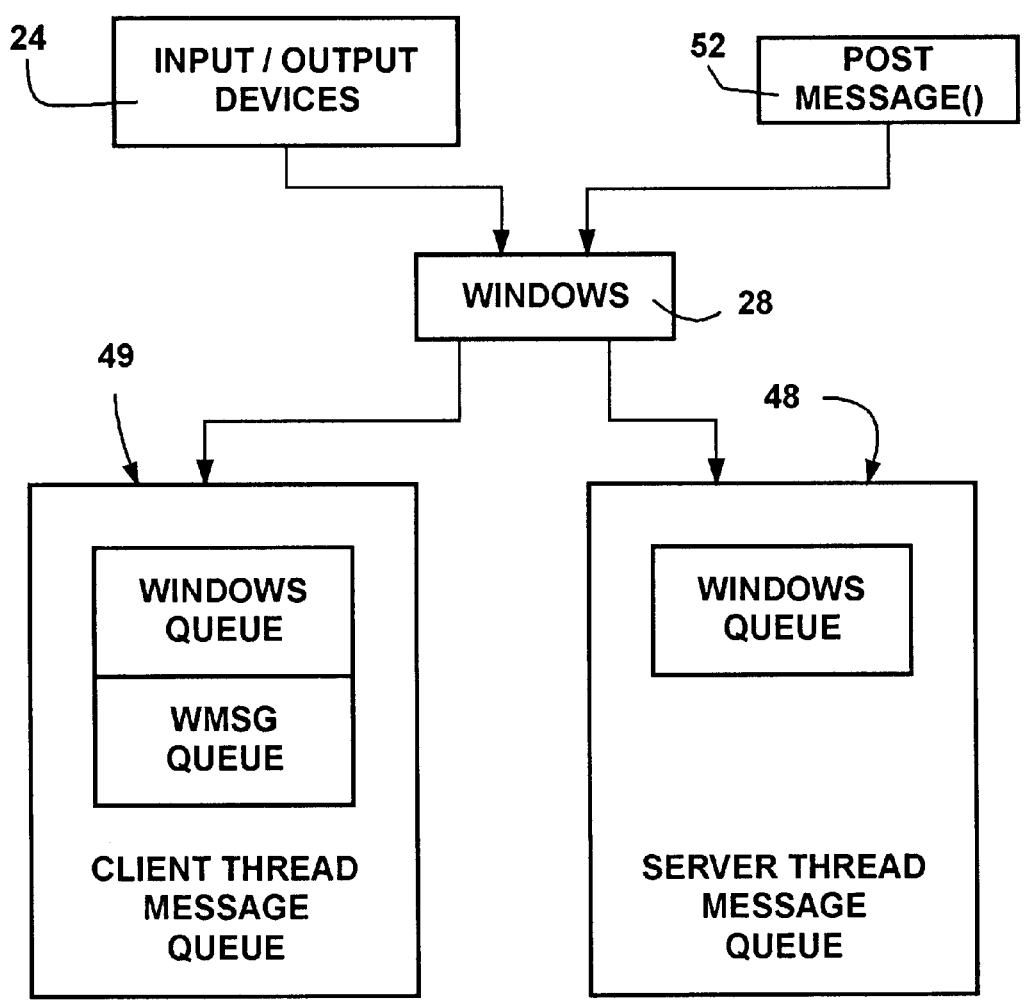
FIG. 2 is a block diagram representing a number of server thread message queues.

FIG. 2 shows server and client message queues 48–49 including the server message queue 48 of the server thread. Windows® 28 posts messages to the queues 48–49 and others, for example in response to keystrokes or mouse events, or when requested to do so by an appropriate function.

In accordance with one aspect of the present invention, the client application 34 and the server application 40 are each associated with a listening thread, (i.e., WMSG thread) 52, 53, respectively. As described in more detail below, the server listening thread 53 receives requests from clients and (via Windows 28) posts messages to the server message queue 48 as shown in FIG. 2. The client listening thread 52 receives replies from servers in response to remote procedure calls thereto and returns the replies to the client application 34. However, as described in more detail below, because applications act as both clients and servers at various times, each of the preferred listening threads 52, 53 are identical to one another and actually receive and deal with both requests and replies.

The invention will now be described with respect to the flow diagrams of FIGS. 4–11, which should be considered in conjunction with corresponding psuedocode included herein. Thus, FIG. 4 represents the main application thread 54 (FIG. 1) on the server, which generally corresponds to the pseudocode set forth below:

```
// Algorithm for the app thread on the server
// main
Function main o
begin
        // setup a LRPC endpoint
        status = RpcServerUseProtseqEp(. . .);
        // create a window with its WndProc registered
        as I_RpcWindowProc.
        WndClass.lpfhWindowProc = I_LRpcWindowProc
        WndClass.lpszClassName = "WMSGClass";
        ...
        RegisterWindowClass(&WndClass);
        hWnd = CreateWindow("WMSGClass", ...)
        // register the window with the RPC runtime, and indicate
        // that we are ready to receive WMSG calls
        status = I_RpcServerStartListening(hWnd);
        ...
        ...
        while (GetMessage(&msg))
        begin
             TranslateMessage(&msg);
             DispatchMessage(&msg);
        end
end
```

Figure 4:
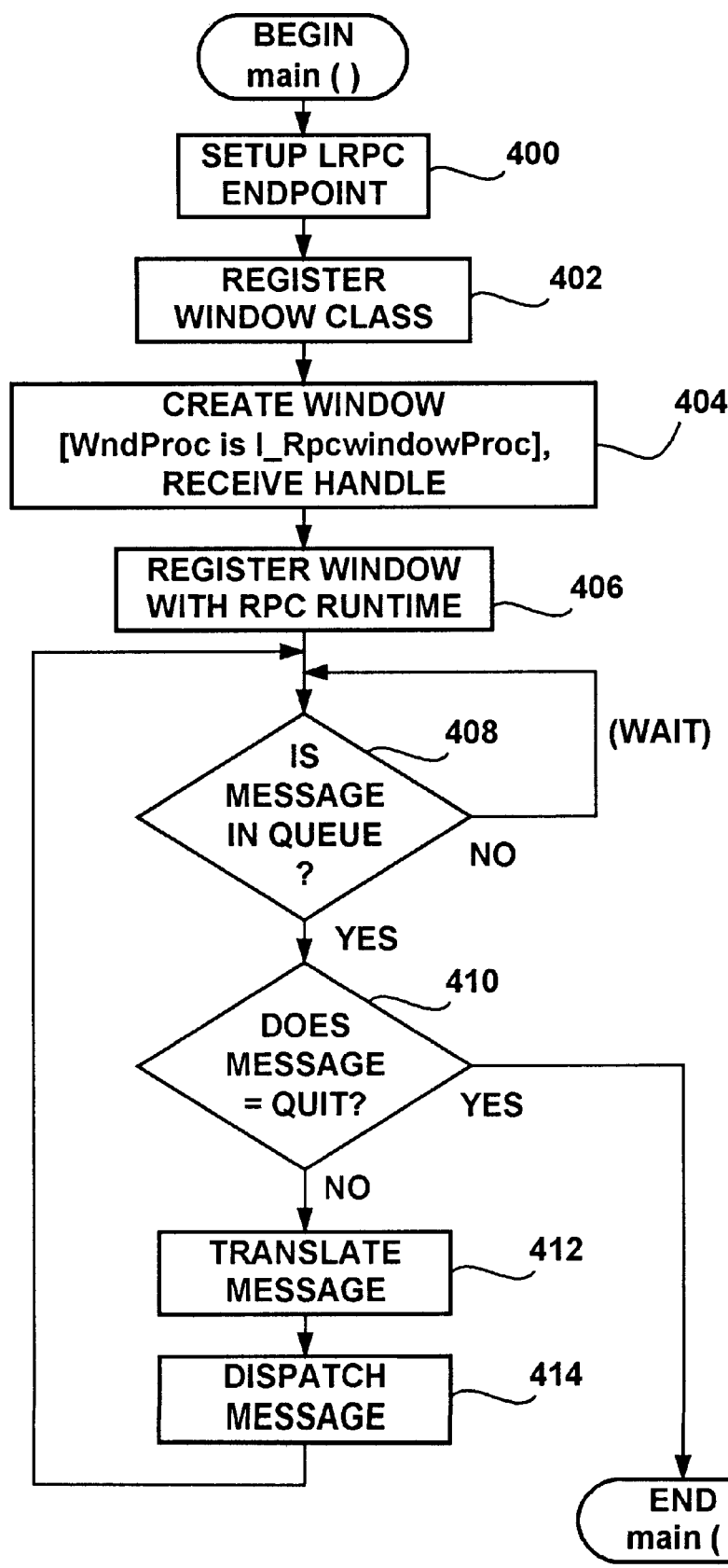
FIG. 4 is a flow diagram representing the general steps taken by the main server thread.

As shown in FIG. 4, in order to start receiving WMSG calls, the main server thread 54 first creates an LRPC endpoint at step 400 such as by using the server RPC runtime routine RpcServerUseProtseqEp( ). As is known, (see e.g., *Microsoft RPC Programming Guide*, J. Shirley and W. Rosenberry, O'Reilly & Asscoiates, Inc, (1995)), this routine establishes server binding information using a specified protocol sequence and endpoint. Static endpoints can be used, or the endpoint can be registered in an endpoint map so that clients can get to this information.

Next the server creates a window 56 with its WndProc as I_RpcWindowProc. To this end, at steps 402–404, the window 56 will be created for processing messages, first by registering the window class (step 402) and then by creating the window 56 (step 404) as described below. However, before registering the window class, the WNDPROC field of the WNDCLASS data structure is initialized with I_RpcWindowProc and the class name field is provided with the string "WMSGClass" to name the window class. Then, at step 402 the WNDCLASS data structure is actually registered, and at step 404 the window 56 is created by calling the create window API function in Windows 28 with a number of parameters including the zero string "WMSG-Class." The create window API returns a handle to the window 56 which is saved in the variable hWnd. Steps 402–404 are generally described in *Programming Windows* 95, Charles Petzold, Microsoft Press (1996).

At step 406, the window 56 is registered with the server RPC runtime 46 by calling I_RpcServerStartListening and passing the window handle stored in hwnd. This effectively tells the RPC runtime 46 that the window 56 is ready to receive WMSG calls. Lastly, the server thread 54 sits in a normal message loop begun by a GetMessage(&msg) call, as logically represented by steps 408–414. If a message is in the queue 48 (step 408) and it is not a quit instruction (step 410) then in response to the GetMessage call, Windows 28 fills in the fields of the message structure (&msg) with the next message from the message queue 48. As is known, the TranslateMessage call (step 412) processes keystrokes, and the DispatchMessage(&msg) call passes the &msg structure to Windows 28 which then calls the appropriate window procedure, in this case, the servers window procedure 56, for processing.

Figure 5:
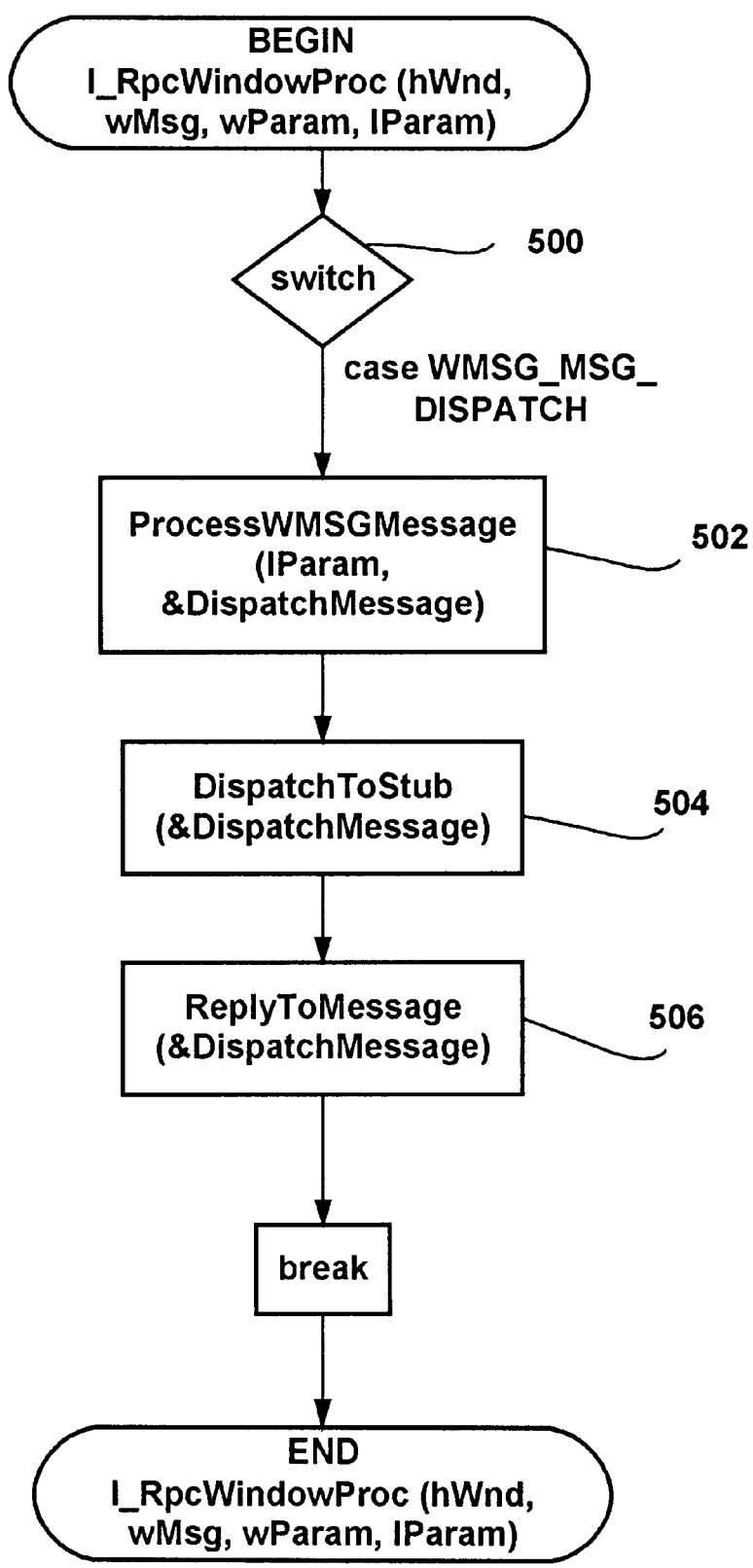
FIG. 5 is a flow diagram representing the general steps taken by the window procedure of the server application thread in dispatching client requests.

FIG. 5 shows the general steps of the I_RpcWindowProc window procedure 56 that was registered, created and dispatched to (via Windows 28) in the main server application algorithm 54 of FIG. 4. As before, FIG. 5 generally corresponds to the pseudocode for the window procedure 56 set forth below:

```
// Algorithm for the window proc. The code is executed by the
// application thread.
Function I_RpcWindowProc (hWnd, wMsg, wParam, lParam)
begin
        switch (wMsg)
        begin
        case WMSG_MSG_DISPATCH:
            ProcessWMSGMessage(lParam, &DispatchMessage);
            DispatchToStub(&DispatchMessage);
            ReplyToMessage(&DispatchMessage);
            break;
        end
end
```

I_RpcWindowProc, the Windows procedure 56 belonging to the RPC runtime 46, is passed variables including hWnd, the handle to the window receiving the message, wMsg, a 32-bit number that identifies the message, and two message-specific parameters wParam and lParam which may provide additional information about the message. Step 500 of FIG. 5 tests whether the message to be processed is WMSG_MSG_DISPATCH, i.e., is a message posted by the listening thread 53. Other messages in the queue 48 will not be processed by I_RpcWindowProc 56, and as such may be passed to a Windows® 28 function such as DefWindowProc (not shown) or another similar function for default processing.

In the case where a message was posted by the listening thread 53, some time later this message will be taken from the queue 48 and handled by the WinProc 56 of the server thread. In the WinProc 56, the message is processed at step 502 (ProcessWMSGMessage (lparam, &DispatchMessage)) to determine the object the message is destined for, and then dispatched at step 504 to the server stub 44. Note that at this point, an application may enter its main message loop (steps 408–414) for an arbitrary amount of time. As is known, the server stub 44 unmarshals the client arguments and, via the server runtime, 46, calls the remote procedure (object) 42. Control ultimately returns to the window 56 of the server thread through the server runtime 46 and stub 44. The window 56 replies to the message at step 506 using a datagram LPC, the stub 44 marshaling the reply data and sending the data to the client listening thread 52 through the server runtime 46.

Figure 6:
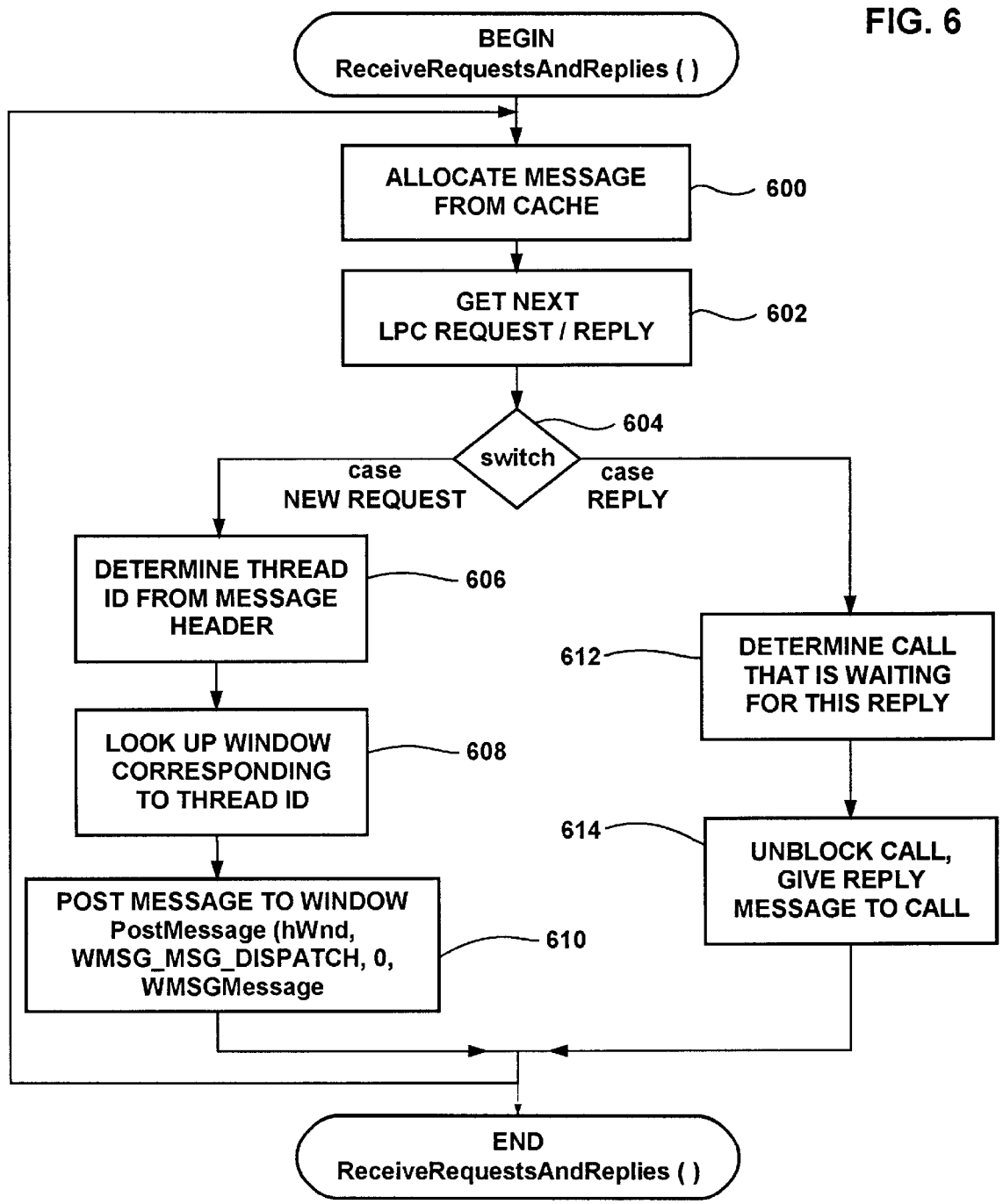
FIG. 6 is a flow diagram representing the general steps taken by a listening thread to receive requests as a server and replies as a client in accordance with one aspect of the present invention.

FIG. 6 represents the steps executed by each of the WMSG listening threads 52 or 53. As described above, since applications can be both clients and servers at various times, the listening thread is the same for the client and the server, branching appropriately when receiving either a new request from a remote client or a remote server's reply. Thus, each listening thread 52, 53 loops forever, waiting for either new requests to arrive, or for replies to arrive in response to requests made by the client thread 35 of the current process. The pseudocode for the WMSG listening thread is generally set forth below:

```
// Algorithm for the WMSG listening thread. This thread exists
// on the client process as well as the server process.
Function ReceiveRequestsAndRepliesO
begin
        do forever
        begin
        // allocate a message from the message cache.
        // This message is freed after the call is over.
        WMSGMessage = AllocateMessageFromCacheo;
        // pick up next LPC request
        NtReplyWaitReceivePort(LPCPort,&WMSGMessage, . . .);
        switch(WMSGMessage->message_type)
        begin
        case new_request:
            // look at the message header to find out what
            // thread id we need to dispatch to.
            // It is possible to have multiple apartment threads.
            tid = LookupThreadId(WMSGMessage);
            . . .
            // lookup the window corresponding to the thread to which
            // this message is destined.
            hWnd = LookuphWnd(tid);
            . . .
            // post a message to the window. When this message is
            // dispatched by the thread, the WMSG call will actually get
            // dispatched.
            PostMessage(hWnd, WMSG_MSG_DISPATCH, 0,
                WMSGMessage);
            break;
        case reply:
            //we just received a reply
            // find out which call is waiting for this reply.
            Call = LookupCallWaitingForThisReply(WMSGMessage);
            // tell the call to unblock, and give it the reply message.
            Call->Unblock(WMSGMessage);
            break;
        end // switch
        end // do forever
end // ReceiveRequestsAndReplies
```

Steps 600–602 of FIG. 6 are performed whenever a request or reply is available at the listening thread's local procedure call port. A message variable WSMGMessage is allocated from a message cache (step 600) and filled in with the next request or reply (step 602) by a call to NtReplyWaitReceivePort( ). At step 604, a determination is made as to whether a new request (from a remote client) or a reply to an outstanding request (from a remote server) was received at the listening thread based upon the message_type value in the WMSGMessage data structure.

In the case of a new request having been received, (e.g. at listening thread 53), a thread identifier (tid) present in a header of the message is first extracted therefrom at step 606 by calling the Windows function LookupThreadID and passing the WMSGMessage data structure as a parameter. This step is performed because multiple apartment threads are possible, and thus a given message may be destined for any one of a number of server threads and that particular thread's message queue. Apartment threads are described in U.S. patent application Ser. No. 08/381,635, assigned to the assignee of the present invention. Step 608 determines which window corresponds to this the thread identifier by calling a function Lookuphwnd and passing it the thread identifier (tid). Lastly, at step 610, this message is posted to the appropriate window (i.e., placed in the message queue 48) by a call to the Windows 28 API PostMessage( ). PostMessage( ) is passed the appropriate parameters including the window handle hWnd, the WMSG_MSG_DISPATCH identifying number, and the message itself in WMSGMessage. The listening thread (e.g., server listening thread 53) then loops back to receive and process other requests and replies.

In the alternative case of a reply having been received at the WMSG thread (e.g., client listening thread 52), step 604 branches to step 612 where the call that was waiting for this particular reply is determined by the function LookupCallWaitingForThisReply( ) based on the WMSG-Message structure passed thereto. The determination is made because a number of calls may be outstanding at any given time. In keeping with the invention, such a call was initiated in the stub 36 and blocked by the runtime 38 so that the client thread 35 can perform other useful work rather than wait for the reply. Thus, at step 614 the appropriate call is unblocked by the client listening thread 52 and the reply message is provided to the client thread (e.g., thread 35) that made the call in the buffer 58. The client listening thread 52 then loops back (to step 600) to receive and process other requests and replies.

One way in which the client listening thread 52 can notify the client thread 35 of the receipt of the reply from the server thread 41 includes posting a message to a client message queue 49 (FIG. 1), whereby the client thread will ultimately receive the message as it gets messages in its message loop. However, a more optimal way to notify the client thread 35 is to have the client thread 35 wait for an event, (apart from waiting for Windows messages), using the Windows® 28 API MsgWaitForMultipleObjects( ), and have the client WMSG thread 52 signal the client thread 35 by calling SetEvent( ) when the reply is received.

Figure 7:
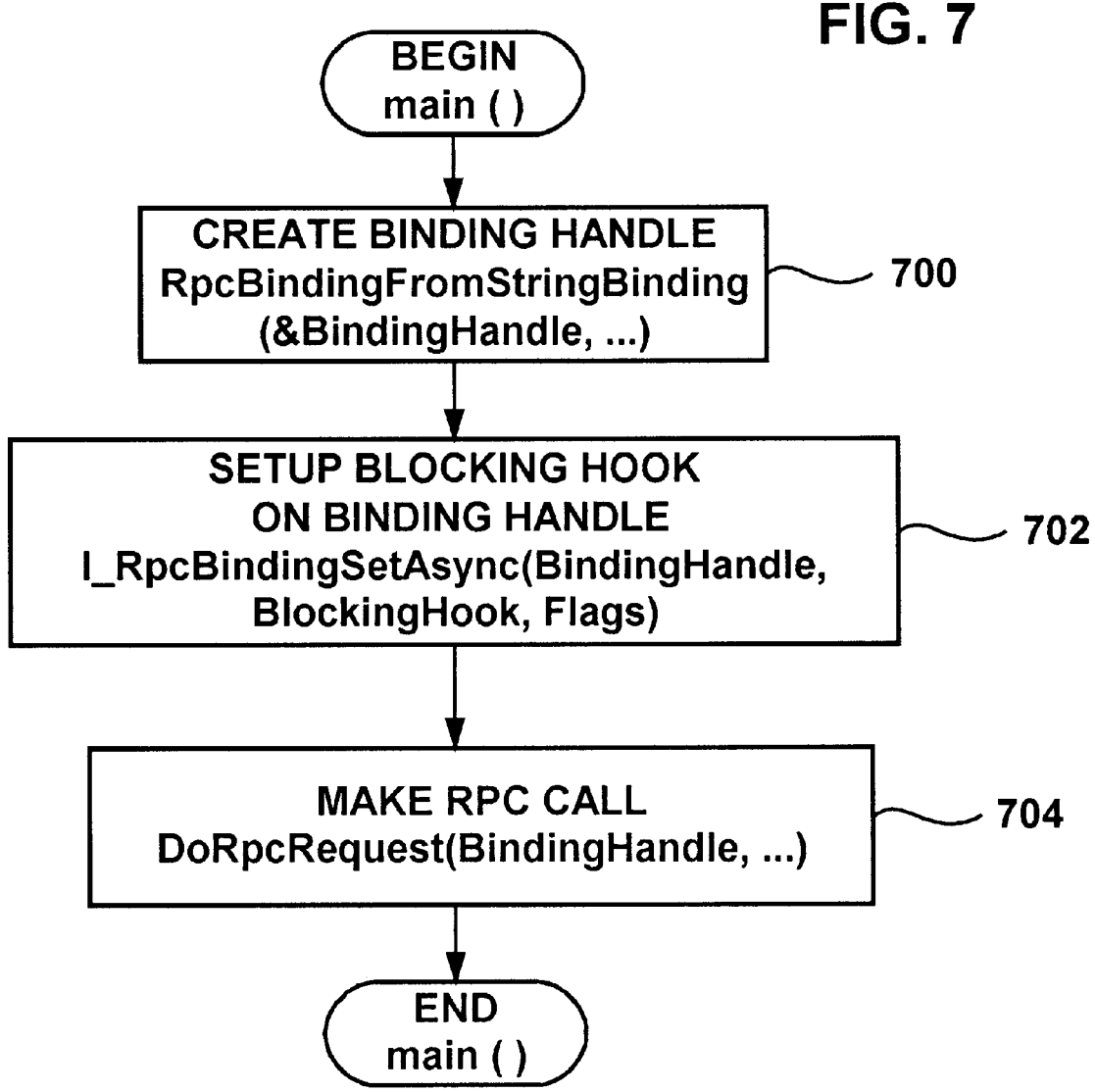
FIG. 7 is a flow diagram representing the general steps taken by the main client thread.
Figure 8:
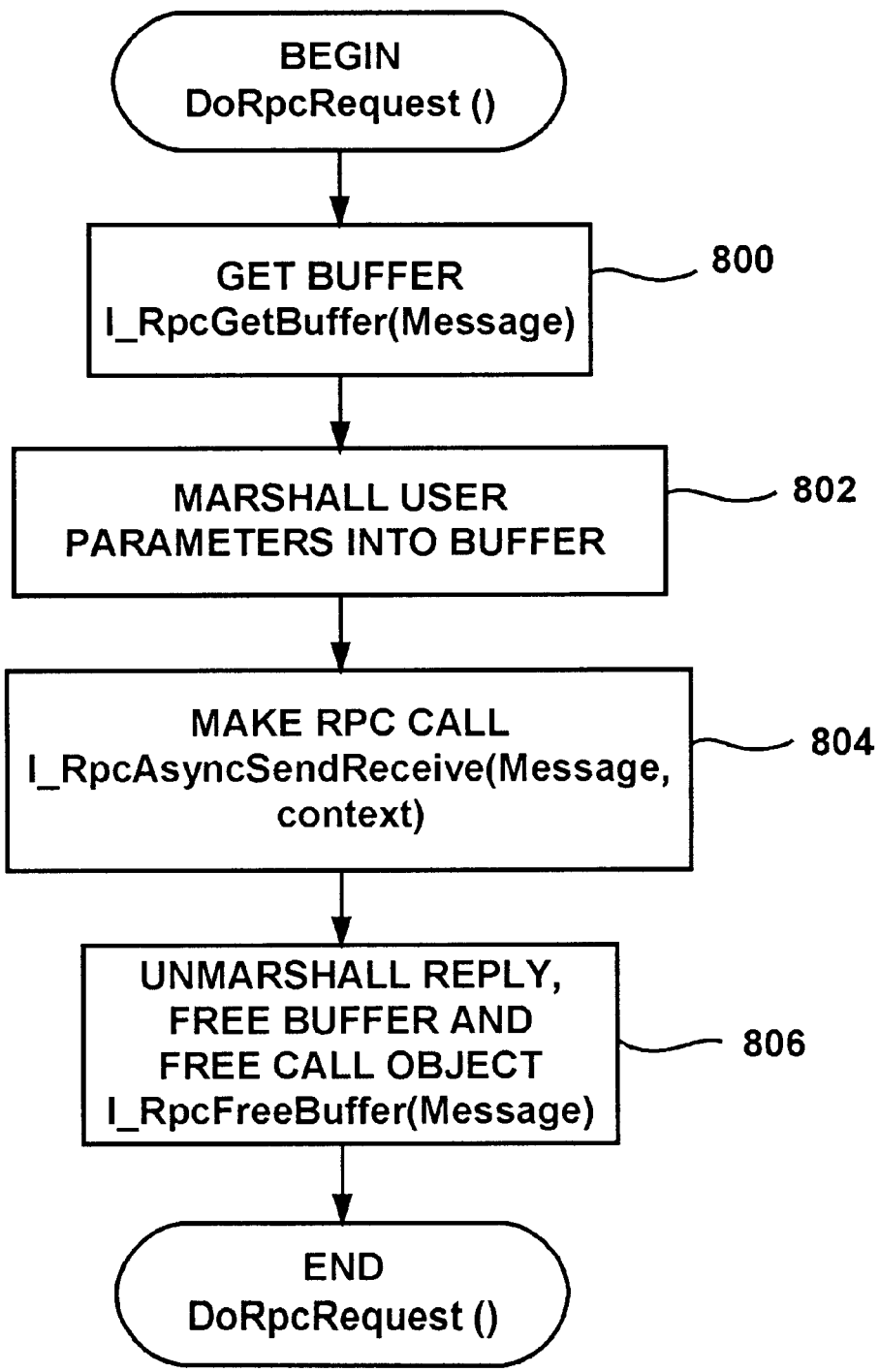
FIG. 8 is a flow diagram representing the general steps taken by the client stub in marshaling parameters for the RPC call and unmarshaling replies.

FIGS. 7–11 represent the general steps taken by the client thread 35. In general, FIG. 7 represents the main client thread algorithm, and FIG. 8 represents the function DoRpcRequest, which is the client stub 36 that performs the actual RPC. The stub 36 calls into the RPC runtime 38 to get a buffer 58 into which the request will be marshaled. The stub 36 then marshals the message into the buffer 58 and calls I_RpcAsyncSendReceive, which blocks until the reply is received. However, when the RPC runtime 38 is waiting for the reply, the runtime 38 calls the client's blocking hook 32 enabling the client thread 35 to perform other tasks. Sometime later when the call unblocks from the RPC 38, the buffer 58 contains the reply. The reply is then unmarshaled by the stub 36.

The algorithm for the client thread is set forth below, beginning with the main( ) function represented in FIG. 7:

```
// Algorithm for the client thread,
Function main()
begin
...
// Create a binding handle
status = RpcBindingFromStringBinding(&BindingHandle, . . .);
...
// Setup the blocking hook on the binding handle
status = I_RpcBindingSetAsync(BindingHandle,
BlockingHook, Flags);
...
// make an RPC call
DoRpcRequest(BindingHandle, . . .);
end
```

Step 700 of FIG. 7 first creates a binding handle from a string of binding information through an RPC call, RpcBindingFromStringBinding( ) and returns the handle in the data structure &BindingHandle. The string of binding information may be created such as described in the aforementioned reference entitled *Microsoft RPC Programming Guide*, e.g., with another RPC call, RpcStringBindingCompose. Step 702 sets up the blocking hook on this binding handle so that the blocking hook can be called while awaiting the reply. Lastly, step 704 passes control to the client stub 36 by calling DpRpcRequest and passing this function the binding handle.

FIG. 8 represents the client stub function 36 generally set forth below:

```
// client stub
Function DoRpcRequest(BindingHandle, . . .)
begin
...
Message->Handle = BindingHandle;
...
// get a buffer to marshall the request into.
status = I_RpcGetBufferMessage);
...
// marshall user params into the runtime buffer
...
// actually make the RPC call
status = I_RpcAsyncSendReceive(Message, context);
...
// unmarshal the reply
I_RpcFreeBufferMessage);
end
```

As shown in FIG. 8, the stub 36 begins by setting the message handle to the value of the binding handle. At step 800 the stub gets a buffer 58 for sending the message to the server by calling the I_RpcGetBuffer function, which is represented by FIG. 9 and the psuedocode set forth below:

```
Function I_RpcGetBuffer(Message)
begin
// Establish a connection to the server if necessary
status = BindToServerIfNecessary();
...
// allocate a call object for this RPC
Ccall = AllocateCall();
...
Message->Handle = Ccall;
...
Message->Buffer = Ccall->AllocateMessage();
...
end
```

Figure 9:
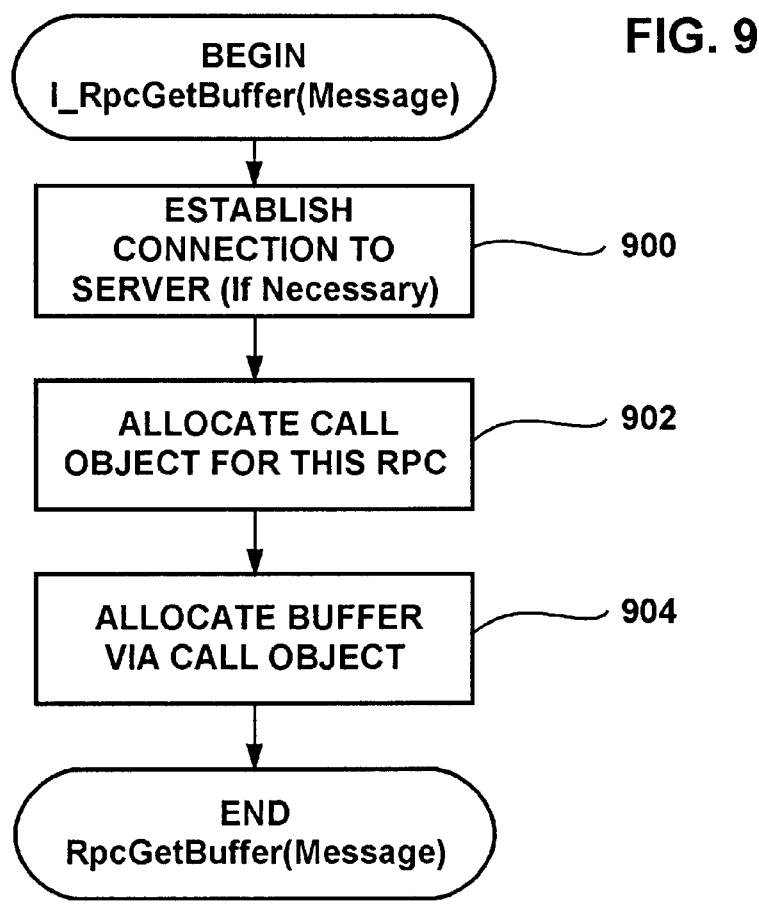
FIG. 9 is a flow diagram representing the general steps taken by a function to obtain a request buffer for the client stub of FIG. 8.

The I_RpcGetBuffer(Message) function begins at step 900 of FIG. 9 by first establishing a connection to the server, if not already connected, using the RPC call BindToServerIfNecessary. At this time there is a binding to the server. At step 902, an object, known as a call object Ccall 60, is allocated to represent the remote procedure call and contain the header and data of the message. Once the call object 60 is allocated, the handle field of the message is set to the call object Ccall 60, and Ccall allocates the message buffer at step 904 by calling a function known as AllocateMessage( ). The function then returns to client stub 36 at step 802 of FIG. 8.

Step 802 marshals the client call data into the buffer in a known manner, such as described in U.S. Pat. No. 5,511,197, (assigned to the assignee of the present invention). At this time, the LPC call is virtually ready. To make the LPC call, step 804 calls the function I_RpcAsyncSendReceive (Message, Context) which is represented by FIG. 10 and the psuedocode set forth below:

```
Function I_RpcAsyncSendReceive(Message, Context)
begin
    Ccall = Message->Handle;
    WMSGMessage Ccall->PrepareRequestMessage(Message);
    // send the request message
    status = Ccall->SendRequest(WMSGMessage);
    ...
    // call the blocking hook while you wait for the reply
    status = (* (Ccall->BindingHandle->BlockingFunction))(Context);
    // either the call has been canceled, or we have unblocked.
    if (status == Canceled)
        begin
        // we have been canceled, cleanup.
        Ccall->Cleanupo;
        return Canceled;
        end
    else if (status == OK)
        begin
        // we received a reply, process the reply
        Ccall->ProcessReply(Message);
        return OK;
        end
    else
        begin
        Ccall->Cleanupo;
        return status;
        end
end
```

In one embodiment, the LPC call is an asynchronous, non-blocking send to the server listening thread 53 using datagram LPC. In an alternative embodiment, the call may wait for acknowledgment that the request was received by the listening thread 53. However, as described above, in keeping with the invention, the client thread 35 does not wait for the reply from the server, but (optionally) at most only waits only for acknowledgment that the request has been received by the listening thread 53. In any event, although the client thread 35 actually does the send (as opposed to switching to a worker thread to make the send), the client thread 35 does not do any significant waiting and thus quickly returns to perform other tasks.

Figure 10:
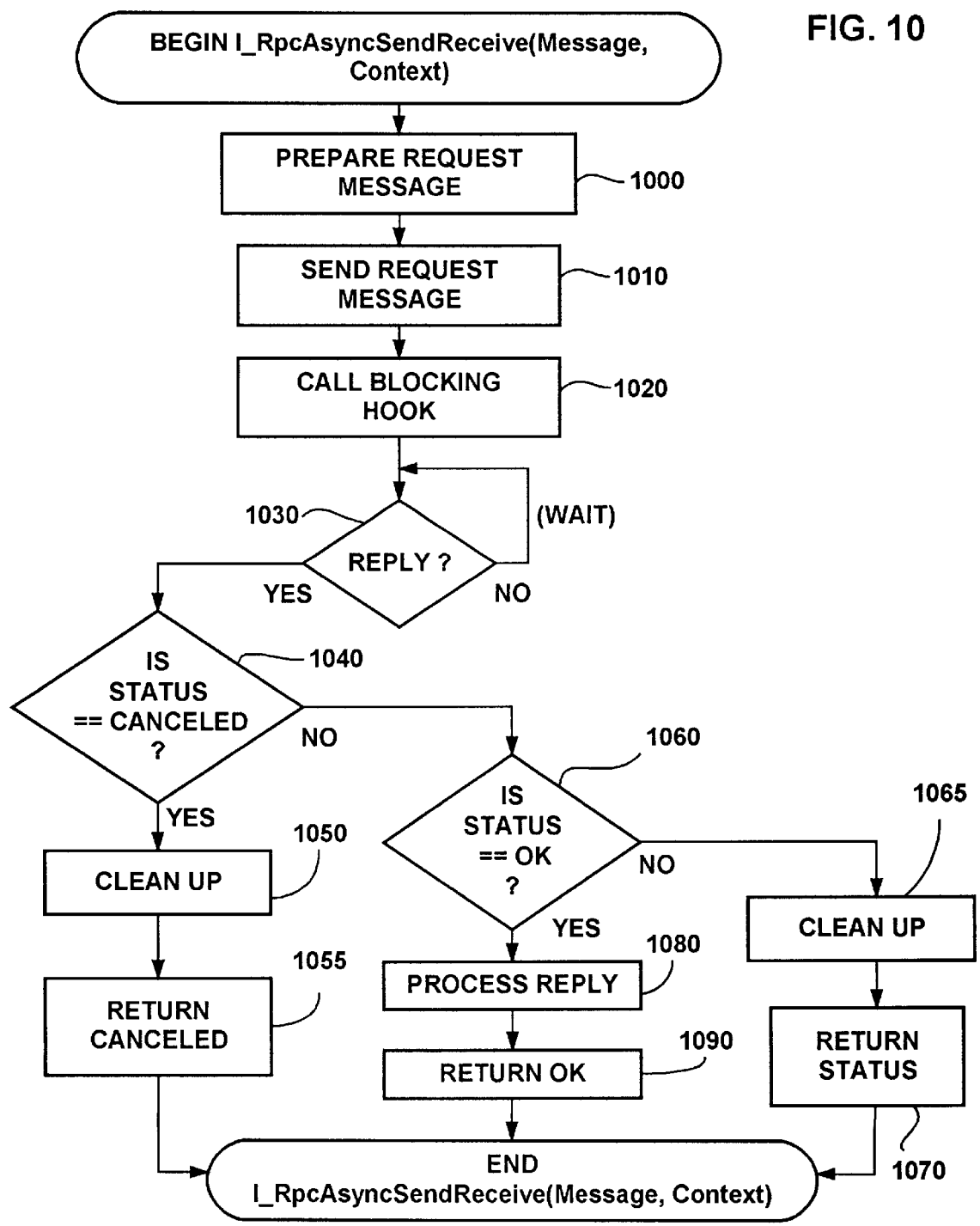
FIG. 10 is a flow diagram representing the general steps taken by a function to make the RPC call for the client stub of FIG. 8.

Step 1000 of FIG. 10 prepares the request message for LPC transmission and sets the prepared message to WMS-GMessage. WSMGMessage is sent to the server listening thread 53 via the call object 60 at step 1010. The RPC call is then blocked awaiting the reply by calling the blocking function 32, in the context of the application thread, at step 1020. Note that at this point, an application generally enters its main message loop (steps 408–414). Thus, at this time, the client thread 35 is free to do other work, including dispatching messages from its message queue 49, possibly sending other requests to the same server and processing requests therefrom. Step 1030 waits for the reply.

Ultimately, a reply or error will be received by the client listening thread 52 from the server thread 41, or the client will cancel the call in the blocking hook. In any event, the runtime wait at step 1030 will be over and the client thread 35 notified of the event. As described above, the listening thread 52 will notify the client thread 35 of the received call, either by causing an event to be set and/or placing a notice in the message queue 49.

One possibility is that the call has been canceled by the client (the client abandons the request while in the blocking hook), which is tested for at step 1040. If so, at steps 1050 and 1055 the call object 60 calls a Cleanup( ) function and returns a "Canceled" status to the stub 36 which informs the client thread 35 that the call failed. The cleanup( ) function frees the buffers, destroys the Ccall object and the like.

Another possibility is that the client listening thread unblocked the call and the status is OK. This is tested for at step 1060. Note that if any other status is received at step 1060, the cleanup( ) function is called at step 1065, the function branches to step 1070 and returns that status to the stub 36. However, if a proper reply was received as indicated by a status of OK, at step 1080 the call object 60 sends the Message to a ProcessReply( ) function which processes the message for the stub function 36. At step 1090, the runtime 38 returns an OK as the status to the stub function 36 (FIG. 8, step 806).

Figure 11:
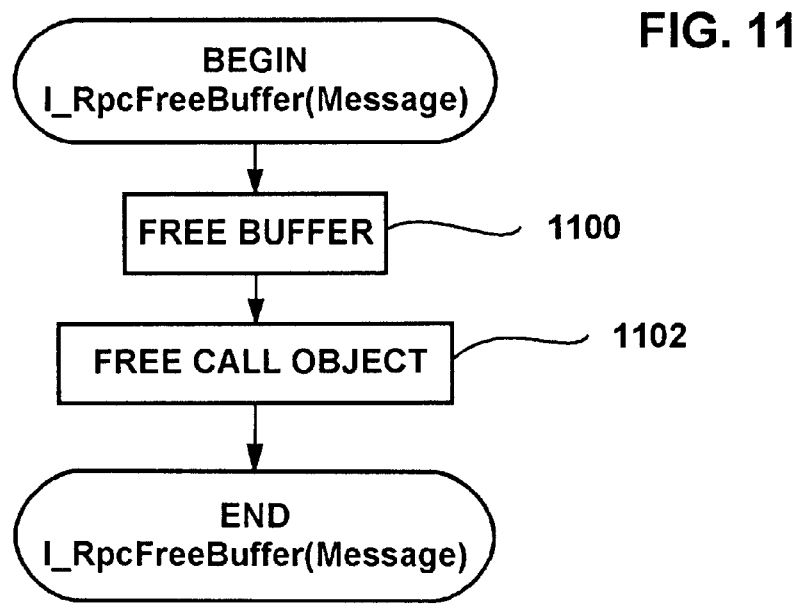
FIG. 11 is a flow diagram representing the general steps taken by a function to free the request buffer.

Assuming the status is OK, at step 806 the reply is unmarshaled by the stub 36 so that the reply data can be understood by the client thread 35. Lastly, the stub calls I_RpcFreeBuffer, passing the message buffer to the function, as shown in FIG. 11 and as set forth below:

```
Function I_RpcFreeBuffer(Message)
begin
    Ccall = Message->Handle;
    // free the buffer
    Ccall->FreeMessage(Message);
    // free the call object
    FreeCCall(Ccall);
end
```

The I_RpcFreeBuffer function sets the call object 60 to the appropriate message handle. At step 1100 the call object 60 frees the buffer that it previously allocated (step 904 of FIG. 9), and then the call object 60 itself is freed at step 1110. At this time, the call is complete, the client thread 35 has the proper reply data and can thus return to the client application 34.

The general high-level operation of the invention will now be described with particular respect to the timing diagram of FIGS. 3A and 3B. As described above, the operation is initiated when the client thread 35 wishes to make a remote procedure call to the server application 40. The client stub 36 recognizes the request as destined for a remote server, and (first in FIG. 3A) synchronously or asynchronously calls the client runtime 38 to get a buffer for sending to the server. The stub 36 appropriately marshals the request data into the buffer 58. When the call returns, the client application expects the runtime 38 to return the reply data. At this time, the client WMSG thread is waiting for requests and replies, the server application is waiting in its message loop, and the server WMSG thread is waiting for requests and replies.

Second in FIG. 3A, the runtime 38 sends a datagram LPC request to the server 40 in the context of the application thread. The request contains the client's request data in the buffer 58. Third, the client thread 35 then calls the client application's blocking hook 32, so that the client thread 35 can do other work (e.g., dispatch messages) while waiting for a reply from the server 40. Typically such client work includes reading messages from its own message queue and appropriately dispatching those messages.

In accordance with one aspect of the invention, the server listening WMSG thread 53 picks up the client's request (fourth) and determines the thread id of the server thread 41 to which the request message is destined. As described above, the server 40 keeps track of a window handle per server thread. This handle is registered by the server thread 41 when it wants to start receiving calls.

The WMSG thread 53 maps the server thread id to the corresponding window handle, and then, fifth, posts a message to that window 56, (i.e., Windows 28 places the message in the appropriate queue 48), passing the window 56 information about the request that was received from the client. Sixth, the WMSG thread 53 then goes back to listening from more requests or replies.

The actual dispatch to the remote procedure 42 occurs when the server thread 41 (via the message loop in the main procedure 54) gets around to dispatching the windows message posted by the WMSG thread 53. When the server thread 41 picks up and dispatches the windows message, (seventh in FIG. 3A), the WndProc 56 registered with the server RPC runtime 46 is called. The runtime 46 processes the request, and does the actual dispatch (eighth, FIG. 3B) to the remote procedure 42.

On return from the remote procedure 42, control returns back to the WndProc 56 of the RPC runtime 46. The runtime 46 (executing in the server thread 41) sends the reply back to the client process such as by doing a datagram LPC send or a synchronous send (ninth in FIG. 3B) to the WMSG listening thread 52 on the client process. The server thread 41 then goes back to its message loop in the main function 54.

Tenth, the WMSG listening thread 52 on the client picks up the reply and looks up the call waiting for this reply. Eleventh, the listening thread 52 then notifies the appropriate client thread 35 that the reply has arrived, (i.e., wakes up the client thread), and gives it the reply message. Twelfth, the client listening thread 52 then goes back to listening from more requests/replies. Lastly, (thirteenth), the client thread 35 wakes up, picks up the reply and returns to the client application 34.

Note that since the client thread directly sends data to the server listening thread 53, there is no thread switch to a worker thread. Moreover, the client thread does not wait for the reply, but rather merely sends the request (by an asynchronous datagram LPC), at most optionally waiting for an acknowledgment that the request was received. The request is queued in the server's message queue 48, and thus no threads are dedicated to waiting for the call to be serviced and the reply returned. Similarly, the server sends the reply (by an asynchronous datagram LPC) to the client listening thread 52 without waiting for the client to actually receive the reply. No dispatch thread (and thus no thread switch to a dispatch thread) is necessary, and, even if an acknowledgment of receipt is desired by the server, the reply is quickly received and handled by the client listening thread.

Moreover, only one extra listening thread is provided for each server and client regardless of the number of calls made thereby or made thereto. Since a single listening thread handles a number of requests and replies, no threads are dedicated for each call, making the mechanism highly efficient. The mechanism works well with the apartment model where a thread of one process needs to communicate with a thread of a remote process.

As can be seen from the foregoing detailed description, there is provided a more efficient interprocess communication method and mechanism. The method and mechanism use less resources to accomplish interprocess communication, and performs less thread switching operations. The method and mechanism operate without dedicating threads based upon the number of calls sent and/or received.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of interprocess communication, comprising:
   providing a server thread and a server listening thread associated with and separate from the server thread;
   providing a client thread and a client listening thread associated with and separate from the client thread;
   sending a request for processing from the client thread to the server listening thread;
   placing a message in a message queue associated with the server thread prior to receipt by the server thread, the message including the request sent to the server listening thread;
   receiving the message at the server thread;
   processing the client request and sending a reply to the client listening thread; and
   giving the reply from the client listening thread to the client thread.

2. The method of claim 1 further comprising the steps of dispatching the message from the server thread to a remote procedure call runtime function, unmarshaling the message into request information, and dispatching the request information from the runtime to a remote procedure.

3. The method of claim 1 wherein the step of placing a message in a message queue includes the step of calling a function to post the message to a window procedure associated with the message queue, wherein the function places the request in the message queue.

4. The method of claim 1 wherein the step of receiving the message at the server thread includes the step of calling at least one function to get a message from the message queue.

5. The method of claim 4 wherein the step of calling at least one function to get a message from the message queue includes the step of looping in a message loop.

6. The method of claim 1 wherein the step of sending a request from the client thread to the server listening thread includes the steps of allocating a buffer, and placing request information in the buffer.

7. The method of claim 6 wherein the step of allocating a buffer includes the step of allocating an object, wherein the object allocates the buffer.

8. The method of claim 1 wherein the step of sending a request from the client thread to the server listening thread includes sending a datagram local procedure call.

9. The method of claim 1 wherein the step of passing the reply from the client listening thread to the client thread includes the step of notifying the client thread of the received message.

10. The method of claim 1 further comprising the steps of calling a blocking hook from the client thread when the request is sent from the client, and unblocking the call and notifying the client thread via the client listening thread when a reply is received at the client listening thread.

11. The method of claim 1 wherein the server listening thread and the client listening thread each receive both requests and replies.

12. The method of claim 11 wherein each listening thread receives requests and replies from a plurality of remote threads.

13. In a computer system including a processor and a memory, a mechanism for communicating between a client thread and a server thread, comprising:

a server listening thread associated with and separate from the server thread;

a client listening thread associated with and separate from the client thread;

means for sending a request for processing from the client thread to the server listening thread;

a post message function for placing a message in a message queue associated with the server thread prior to receipt by the server thread, the server listening thread including means for calling the post message function with the request sent thereto such that the message placed in the queue includes information corresponding to the request;

means for receiving the message at the server thread;

means for dispatching request information in the message from the server thread to a remote procedure, and means for receiving a reply from the remote procedure;

means for sending reply information to the client listening thread corresponding to the reply from the remote procedure; and means in the client listening thread for providing the reply information to the client thread.

14. The mechanism of claim 13 wherein the means for sending a request from the client thread to the server listening thread includes a client stub function and a client runtime function.

15. The mechanism of claim 13 wherein the post message function is an application programming interface.

16. The mechanism of claim 13 wherein the means for receiving the message at the server thread includes means for calling a get message function to retrieve messages from the message queue.

17. The mechanism of claim 13 wherein the means for dispatching from the server thread to a remote procedure, and for receiving a reply from the remote procedure includes a server stub function and a server runtime function.

18. The mechanism of claim 13 wherein the means in the client listening thread for providing the reply information to the client thread includes means for notifying the client of the received reply.

\* \* \* \* \*